United States Patent [19]
Cliche

[11] Patent Number: 4,911,253
[45] Date of Patent: Mar. 27, 1990

[54] CORE AND WATER COLLECTOR

[76] Inventor: Normand Cliche, 737 chemin Vanier, St. Jean Chrysostome, Quebec G6Z-1Y9, Canada

[21] Appl. No.: 309,177

[22] Filed: Feb. 13, 1989

[30] Foreign Application Priority Data

Sep. 23, 1988 [CA] Canada .................... 578238

[51] Int. Cl.4 .................... B23B 41/00; B23B 47/34; E21B 21/02
[52] U.S. Cl. .................... 175/213; 125/20; 175/215; 408/58
[58] Field of Search ............... 175/213, 215, 217, 209, 175/207, 212, 195; 408/58, 57, 56; 51/267

[56] References Cited

U.S. PATENT DOCUMENTS

| | | | |
|---|---|---|---|
| 2,084,686 | 6/1937 | Howard | 175/217 X |
| 2,419,738 | 4/1947 | Smith | 175/215 X |
| 2,996,061 | 8/1961 | Miller | 125/20 |
| 3,003,493 | 10/1961 | Miller | 408/59 |
| 3,308,689 | 3/1967 | MacDonald | 408/58 X |
| 3,351,143 | 11/1967 | Seibold et al. | 175/209 |
| 3,690,780 | 9/1972 | Bjelland et al. | 408/58 |
| 3,694,099 | 9/1972 | Nicholas | 408/58 |
| 4,209,069 | 6/1980 | Smith | 175/217 X |
| 4,372,401 | 2/1983 | Fischer | 175/209 |
| 4,380,991 | 4/1983 | Richter | 125/20 |
| 4,625,707 | 10/1985 | Whittaker | 125/20 |

Primary Examiner—Stephen J. Novosad

[57] ABSTRACT

Core water and mud collector tool for use by a carrotting drill during the piercing of a concrete floor, said tool being connected as an adaptor between the motor shaft and the shoulder of the circular carrotting drill. Circulating through said tool is a liquid first applied at the exterior of the core drill, passing between the diamond bit segments, and being aspirated to the top between the carrot and the interior of the drill, to be evacuated through the interior of the above adaptor by holes of sizes increasing starting from the inside of the adaptor shaft, going through the wall of said shaft, the tunnel opening of the barrel and the suction tube. The suction has for effect to conserve the carrot in the interior of the carrotting drill when the concrete floor is pierced, such suction helping to exert a reaction in the direction of drilling which facilitates drilling as water is being aspirated, instead of being projected by jet, thus keeping the zone surrounding the punched hole clean.

3 Claims, 11 Drawing Sheets

FIG II

CORE AND WATER COLLECTOR

The present invention relates to a method of bettering the piercing of concrete floors by a diamond circular drill by means of an adaptor tool located between the motor and the carrotting drill.

BACKGROUND OF THE INVENTION

The carrotting drills known are conceived in such a way that water enters through the interior part of the drill and with pressure, said pressure entrapping the mud which eventually accumulates around the drill. When the drilling is complete, the carrot eventually falls onto the inferior level or lower floor with its water content as well as all the water and mud already accumulated during the drilling, which often causes much time for recuperation and cleaning.

Certain inventions in the past have brought forward certain characteristics resembling certain aspects of my invention: Rederon in 1975, patent Canada 967945, has invented a drill with several tips in gradation and with a central open zone. In Canada 854589, the pressure of water is exerted in the central portion of a drill hole and the mud is raised to the outside around a concentric external casing.

Miller, in U.S. Pat. No. 2996061, in 1961, exposes a Tee adaptor with a hole for passing fluids downwards in a diamond drill. Vacuum is used in 1972, by Bjelland in U.S. Pat. No. 3690780, to displace a film under a drill in photography.

Vacuum suction is applied in drilling, in the interior of a tool by Nicholas in 1972, in U.S. Pat. No. 3694099, but without carrotting, whereby vacuum is used to recuperate the chips from drilling.

A system catching dust at the source in holes dug overhead has been presented in 1981, in Canada 1115095 as applied to a radial drill.

A method of coupling a motor to a drill is illustrated in U.S. Pat. No. 4380991 by Richter in 1983.

Teflon as a bearing material retained by a shoulder of the drill is utilized by Whittaker in U.S. Pat. No. 4625707, in 1986.

But none of the above patent references describe the essential group of characteristics of my invention.

OBJECT OF THE INVENTION

The general object of the invention is to eliminate the disadvantages of the above systems by providing a system which removes the carrot and keeps the place clean without external rubber guide.

DRAWINGS

The following drawings will be used for a better understanding of the origins and use of my invention as well as showing its functions.

DESCRIPTION OF PRIOR ART CARROTTING DRILL EQUIPMENT

Figure 1:
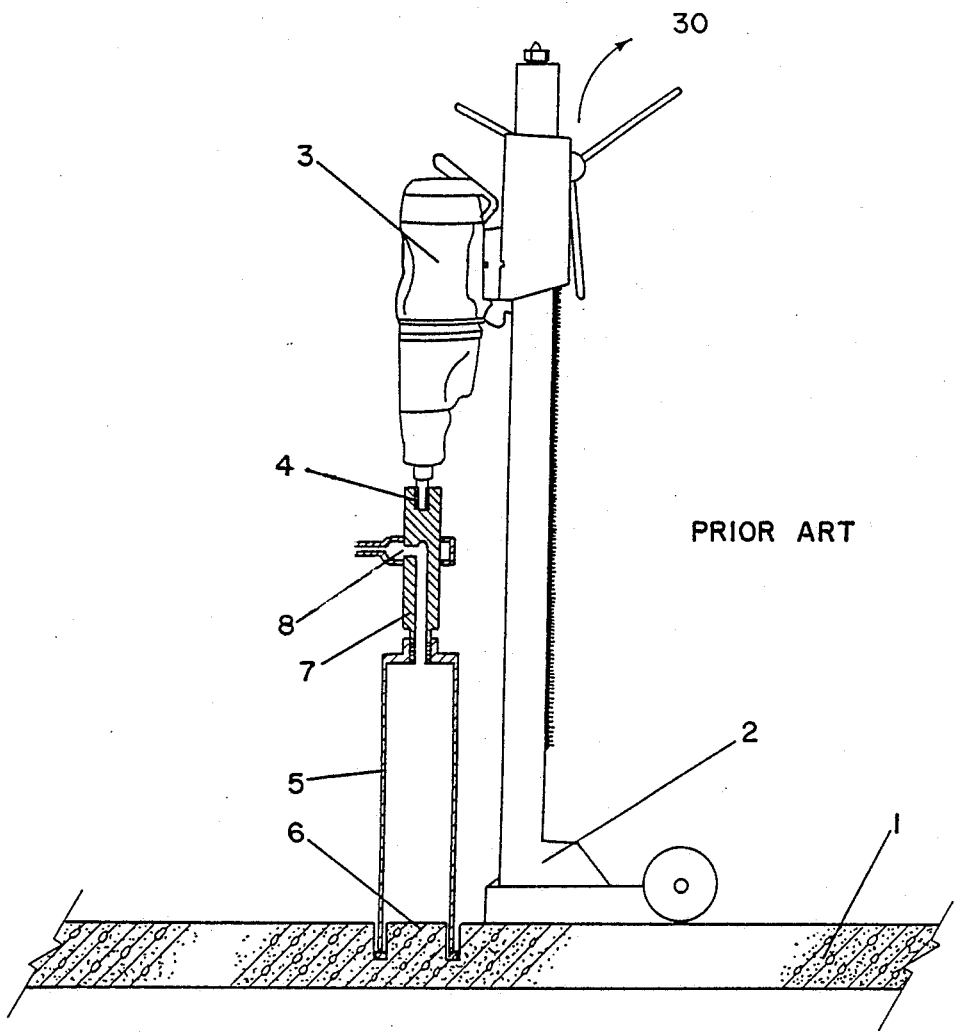
FIG. 1 is a side view of a cut of an existing installation of a carrotting drill illustrating the support base, the motor with its drive shaft, the circulating drill in position to perforate a concrete floor and the adaptor which joins the motor shaft to the circular drill and said adaptor having an internal water passage.
Figure 3A:
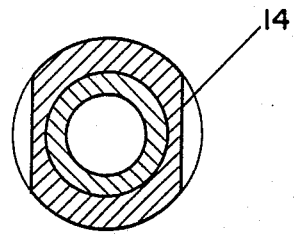
FIG. 3A is a top view of the drill along the cut A—A of FIG. 3 illustrating a flattened part for vicing.

A conventional machine to pierce a concrete floor 1 is illutrated on FIG. 1 and comprises a support 2 supporting a motor 3 whose shaft 4 is driving a carrotting drill 5 which cuts a carrott 6 in floor 1.

So as to supply drill 5 with cooling water, an adaptor-mandrel 7 joins shaft 4 of the motor to drill 5 and possesses an interior channel for water.

Figure 2:
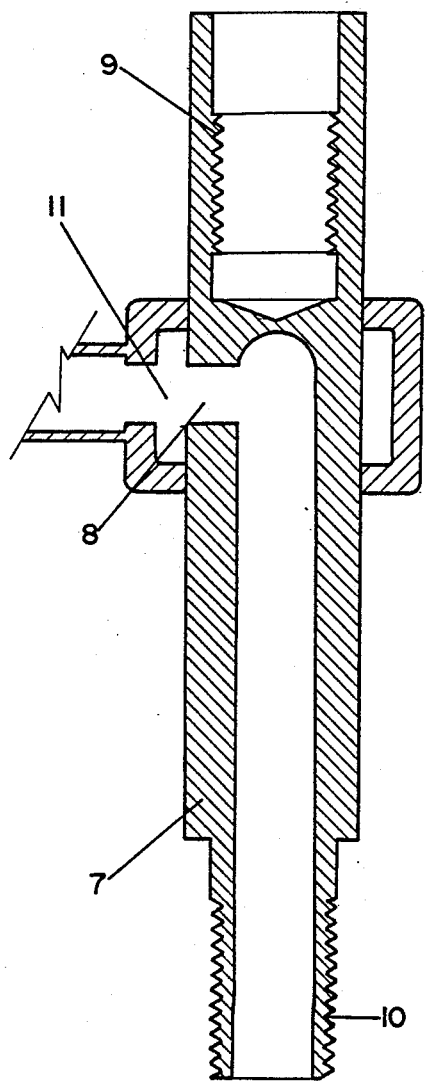
FIG. 2 is a cross section illustrating a conventional adaptor with at its superior part female threads to receive the motor shaft threads, a radial channel for passing water from the outside and an axial channel which passes water downwards and towards the circular drill. The radial channel is fed by a feeding chamber.

A conventional adaptor is illustrated on FIG. 2 and comprises a superior part 9 equipped with female threads to adapt to shaft 4 of the motor and an inferior part equipped with male threads 10 to be adapted to drill 5, the said adaptor possessing also an internal channel 8 for passing water from the interior and distributing it towards the drill 5. A feeding chamber 11 capable of sliding without leak on the mandrel is installed on the existing opening of the internal channel 8.

Figure 3:
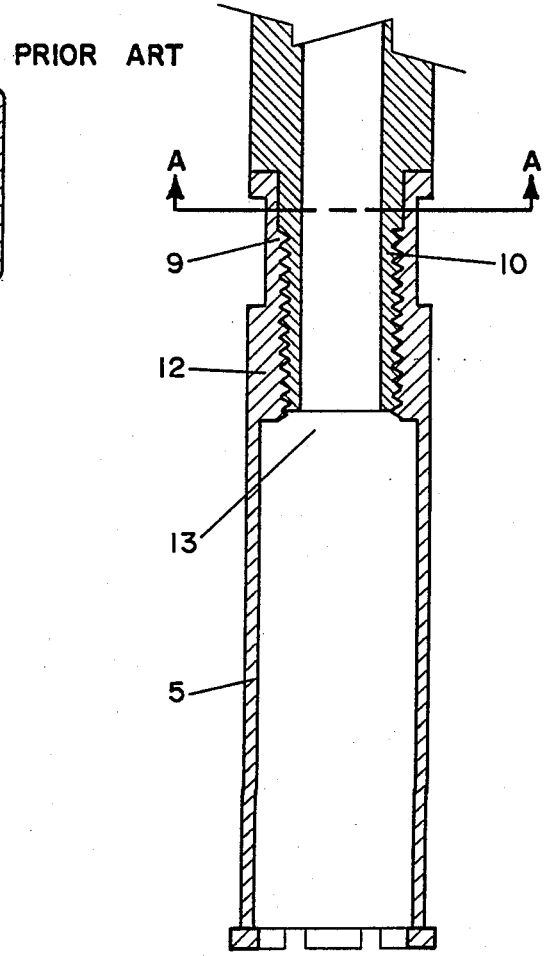
FIG. 3 is a cross section of a conventional drill provided with female threads in its superior part and which may be installed directly onto the adaptor.

There exists various ways of joining adaptor 7 to drill 5. On FIG. 3 a drill of a small diameter may have a superior part 12 reinforced and provided with female threads 13 and capable of adapting to male part 10 of adaptor 7 and offering also a flat surface 14 permitting tightening hold. The same type of threads appear on FIG. 4 in the superior part of a circular drill with large diameter and a shoulder 15.

Figures 4, 5:
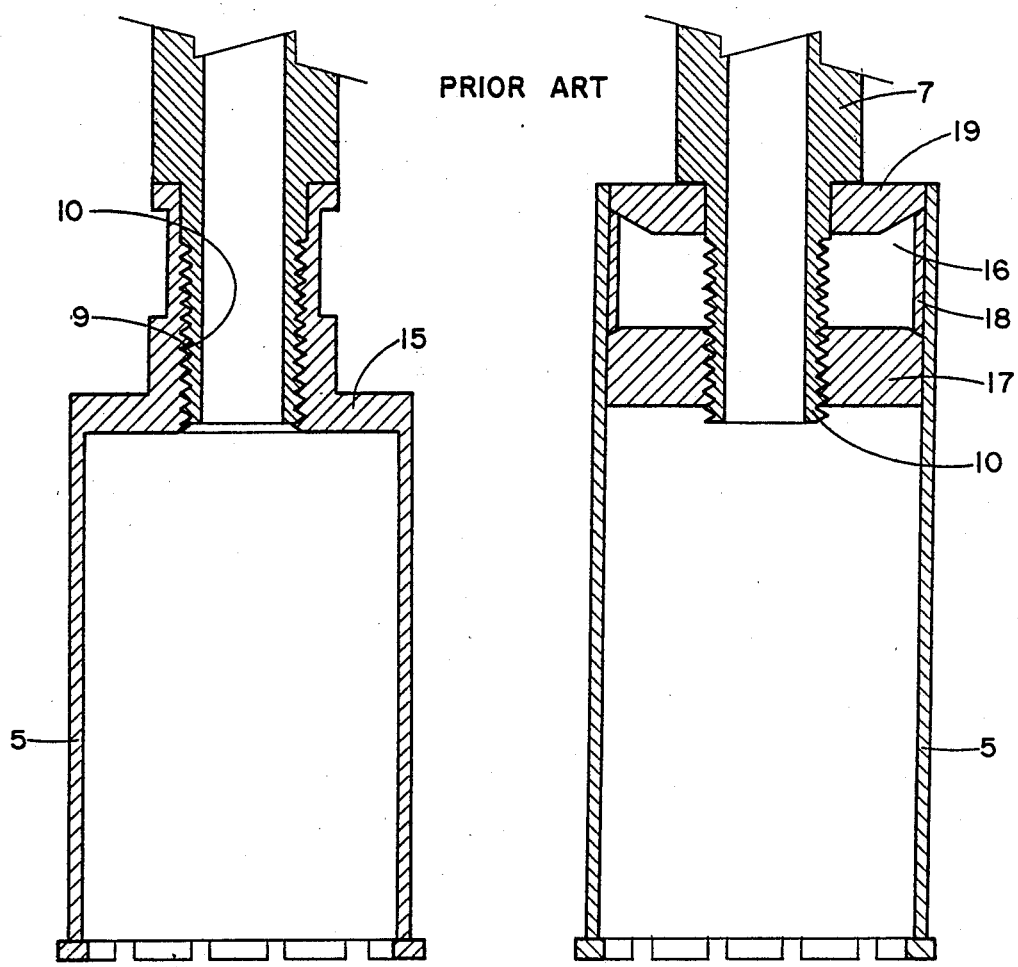
FIG. 4 is a conventional cross section showing the male end of the adaptor threaded in a drill with a shoulder provided with female threads.
FIG. 5 is a cross section showing a conventional vicing adaptor made up of three mountable parts of which one part is pushing against the interior of a circular drill, thereby holding said drill firmly.

Another method of joining adaptor 7 to the drill 5 is shown in FIG. 5, which represents an intermediate adaptor 16 composed of three parts, namely an inferior part 17 tightening the mandrel 10, an intermediate part 18, annular and split axially and which can be pushed towards the exterior namely towards the wall of drill 5, and a superior part 19 holding firmly drill 5 and the mandrel-adaptor 7. This type of intermediary adaptor may be applied to drills of varying diameters.

Drill 5 is circular and cylindrical; mandrel 7 is also hollow in the center and so is adaptor 16.

Figure 6:
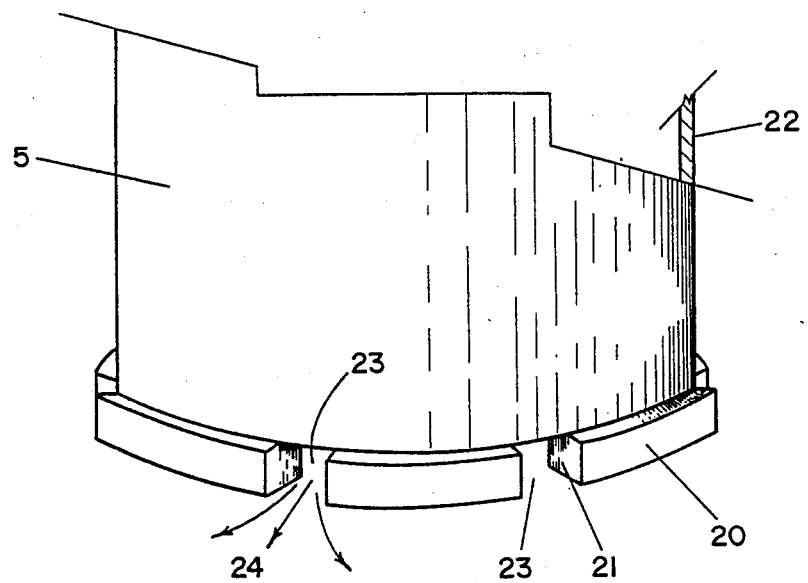
FIG. 6 is a face view of a conventional circular drill illustrating at its base the shape and location of the segments or diamond segment bits.

To understand the process of utilization of water and generation of mud according to prior art, it will be helpful to refer to FIG. 6.

The segments 20 constitute the inferior part and are also the cutting part of the drill 5 and have a thickness 21 greater than the thickness of the wall 22 of drill 5, which leaves a free way of dimension equal to the difference between the thickness 21 of a segment and thickness 22 of the wall of the drill 5.

The openings 23 between the segments 20 allow the horizontal passage of the liquid which enters as water and exits as a mud 24 while collecting the residues of the abrasion of concrete by the diamond segments 20.

Figure 7:
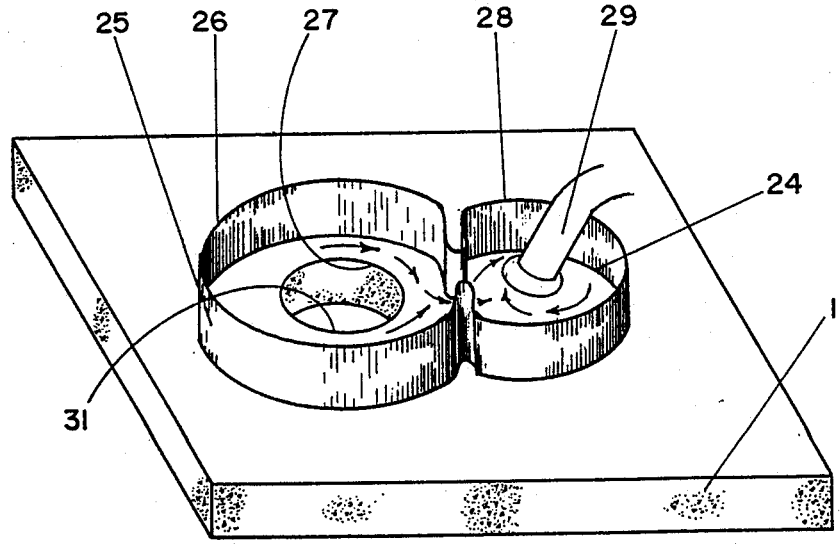
FIG. 7 is an isometric view of a conventional recuperation tool which forms a figure "8" shape and which is placed on the cement floor to be pierced, the larger part of the figure "8" containing the location of the hole to be dug and the other side comprising the tip of the vacuum pipe.

Water being passed from the interior, the mud liquid waste 24 spills around the machine. The operator of the machine must use a recuperator 25 whose conventional model is illustrated in FIG. 7. It is typically a shape as a figure "8" which is utilized, whereby a circular part 26 surrounds the hole 27 to pierce, the liquid being displaced towards the other circular part 28, neighbouring, and in which an aspiration tube 29 is installed.

Even when utilizing the form 25, as long as the machine by its drill has not produced enough mud 24 to block the pores of the cement floor 1, water is liable to spill and expand all over the floor, even at the exterior of the rubber figure "8" form 25. When using the conventional method consisting in introducing water under pressure and starting from the interior and under the drill, there exists a reaction force due to the hydraulic pressure tending to lift the drill and causing a torque 30 according to the arrow on FIG. 1 tending to deviate the angle of the machine.

For water at 50 psi (400 kPa) and a drill of 8 inches in diameter, 20 cm, a reaction force is causes upwards:

50 sq. in.×60 lb/sq. in.=3000 lbs.

and for a drill of 4.5 inches in diameter:

16 sq. in.×60 lb/sq. in.=1000 lbs.

DESCRIPTION OF MY INVENTION

I have conceived the idea of reversing the direction of water flow 32 by applying the water on the external part of drill 5 and making it raise from along the interior part of drill 5 and passing through a modified adaptor 33 capable of receiving continuously a jet of water and mud 24 without interference and direct said flow towards an evacuation by suction or vacuum. The principle of operation of the system will be more clearly understood by referring to FIG. 8.

Figure 8:
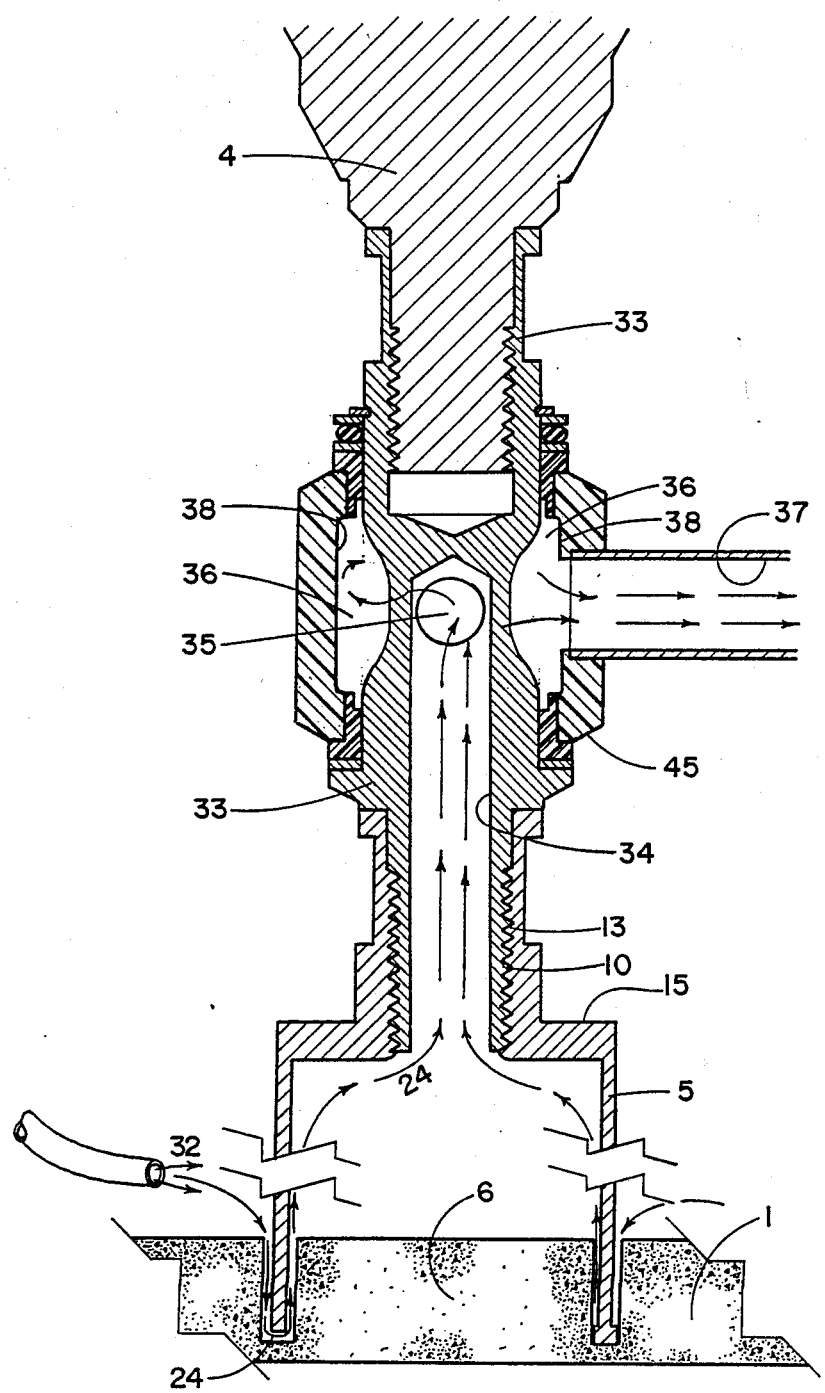
FIG. 8 represents a longitudinal cross section of the drill, the adaptor and the motor shaft, particularly showing the internal passages and the path of the aspiration of the mud by vacuum.

FIG. 8 illustrates a longitudinal cross section ot the apparatus in function in a cement floor, comprising a drill 5 with a shoulder 15, a mandrel-adaptor 33 positioned between drill 5 and the shaft 4 of the motor and provided with openings axial 34, radial 35 and circumferential 36;

a vacuum pipe 37 connected to the open peripheral chamber 36 made in the exterial wall of mandrel 33;

bearings and support pieces to allow the rotation of mandrel-adaptor 33 and whose description will be given further in the text on page 8 of the present.

According to the principle of operation of the preferred embodiment of my invention, said vacuum pipe 37 applied on the peripheral air reserve 36 causes a suction through the radial openings 35 in the wall of mandrel 33 and in the interior 34 of my adaptor. The suction in the adaptor causes a negative pressure in the interior of drill 5 during the cutting of the carrott 6. According to the trajectory indicated by the arrows, the mixture of water and mud generated by the action movement of drill 5 and by the water hose 32 is aspirated through the axial opening 34 of the male part 10 of the adaptor and passes through the double radial openings 35 connected to the air chamber 36 feeding the vacuum pipe 37. Each opening of the system is progressively bigger, thereby reducing the friction and the velocity of the flow.

The dimensions are important to minimize the friction; the mandrel-adaptor 33 is to have an internal diameter approaching that of the opening of the vacuum pipe 37. Again referring to FIG. 8 and to the table below, the areas grow bigger starting from the interior 34 of the mandrel, going through the radial oprnings 35 enterring the barrel, followed by the areas 36 resulting from the geometry of the interior section of the barrel 38 and finally the area 37 of the vacuum pipe, all of the preceeding according to the table below which gives the approximate dimensions of the critical areas.

| | TABLE OF CONTROL AREAS | | |
|---|---|---|---|
| No | Control dimensions | Diameter | Area |
| 34 | Internal diameter | .875" | .67 sq. in. |
| 35 | Exit diameter | .80" | |
| | for two openings .50 sq. in. × 2 | | 1.00 sq. in. |
| 36 | Internal diameter of barrel 38 | 2.25" | |
| | External diameter of mandrel 33 | 1.47" | |
| | Difference in diameters annular space .39" | .78" | |
| | Average height Annular section area .39" × 1.32"; .51 sq. in. | 1.32" | |
| | For both exit sides | | 1.02 sq. in. |
| 37 | Diameter of vacuum pipe | 1.30" | 1.33 sq. in. |

The net effect of the progression in dimensions going towards the exterior is that water and mud once entered in the interior 34 are projected towards the exterior of the peripheral air chamber 36 by the centrifugal force. In conventional systems much pressure was necessary to force water from the exterior of a turning mandrel into the interior of said mandrel, in my system, it becomes natural for water and mud, once in the interior of the mandrel, to centrifuge away from the interior to the exterior, thus conserving the lining of the openings of the mandrel-adaptor 33 and of the barrel 38 clean.

Figures 9, 9A:
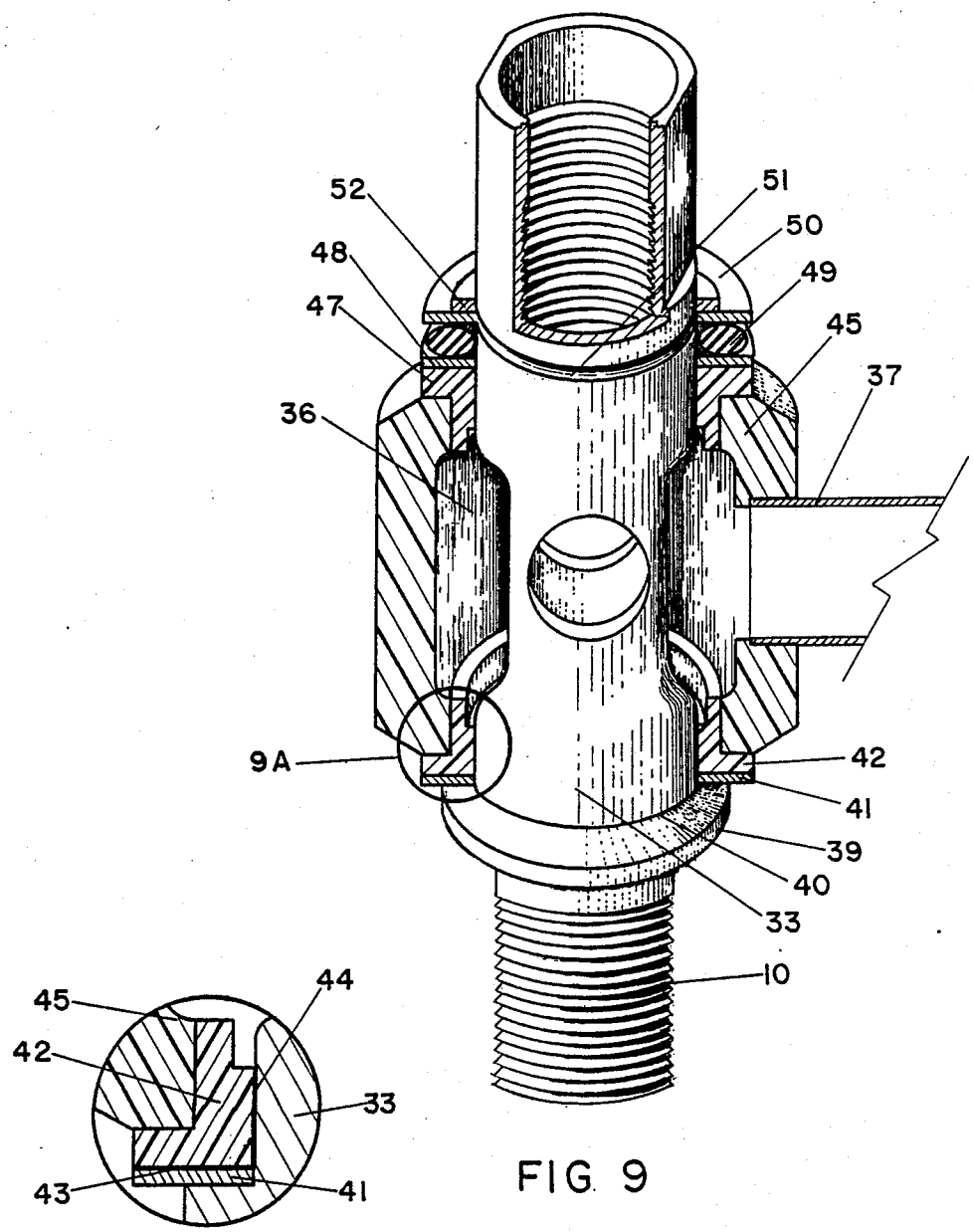
FIG. 9 is an isometric view of the mandrel of the adaptor of my invention as well as a section through the parts that are assembled.
FIG. 9A is a cut view, enlarged, of the nylon bearing, showing in bold lines the parts subject to friction.

To embody the above function, I have conceived a tool as appears in FIG. 9, a tool whose mandrel includes a shoulder 39 provided with a machining radius 40 with sufficient height and friction to retain a stainless steel ring 41 firmly united to said mandrel shoulder 39 and thus making said ring 41 turn at the same time as mandrel 33. A nylon bearing 42 more detailed in FIGS. 9A and 9B has a horizontal part 43 sliding on ring 41 on which it sits, and a vertical part 44 espousing the exterior of mandrel 33 on a certain part of its length, sufficiently to give a maximum of stability without exaggerated friction. The bearing 42, once installed, may espouse the exterior 45 of the barrel.

In the top of FIG. 9 one can see the exterior 45 of the barrel centered at its superior part by another nylon bearing 47 similar to the preceeding bearing 42.

The barrel 45 may be of plastic material, PVC or ABS, non subject to corrosion in a humid atmosphere and its surface must be sufficiently rough to adhere to nylon bearings 42 and 47. The interior of barrel 38 is so constructed to insure the presence of a reserve of air and has therefore a hollow space 36 in its center as well as a central radial opening to the vacuum pipe 37.

The mandrel 33 also has a hollow space 36 in its upper exterior part in the region of the radial openings 35, the hollow space in mandrel 33 and the concave shape of the interior of barrel 38 being located face to face by bearing 42 to define the air reserve or peripheral cage 36.

The second bearing 47 identical to bearing 42 located in the superior axial part and in the interior of the barrel supports a second steel ring 48 identical to ring 41.

This ring 48 must turn with the shaft of the motor and is therefore fixed firmly to said shaft. In the preferred embodiment, I use a "O" ring 49 made of rubber and mounted securely.

A ring 50 similar or identical to rings 48 and 41 is placed on the superior part of "O" 49. A groove or lock key 51 practicated around the cylindrical part of my adaptor surrounding the shaft of the motor, allows to receive a lock ring 52 which holds rings 48 and 49 together.

Figure 9B:
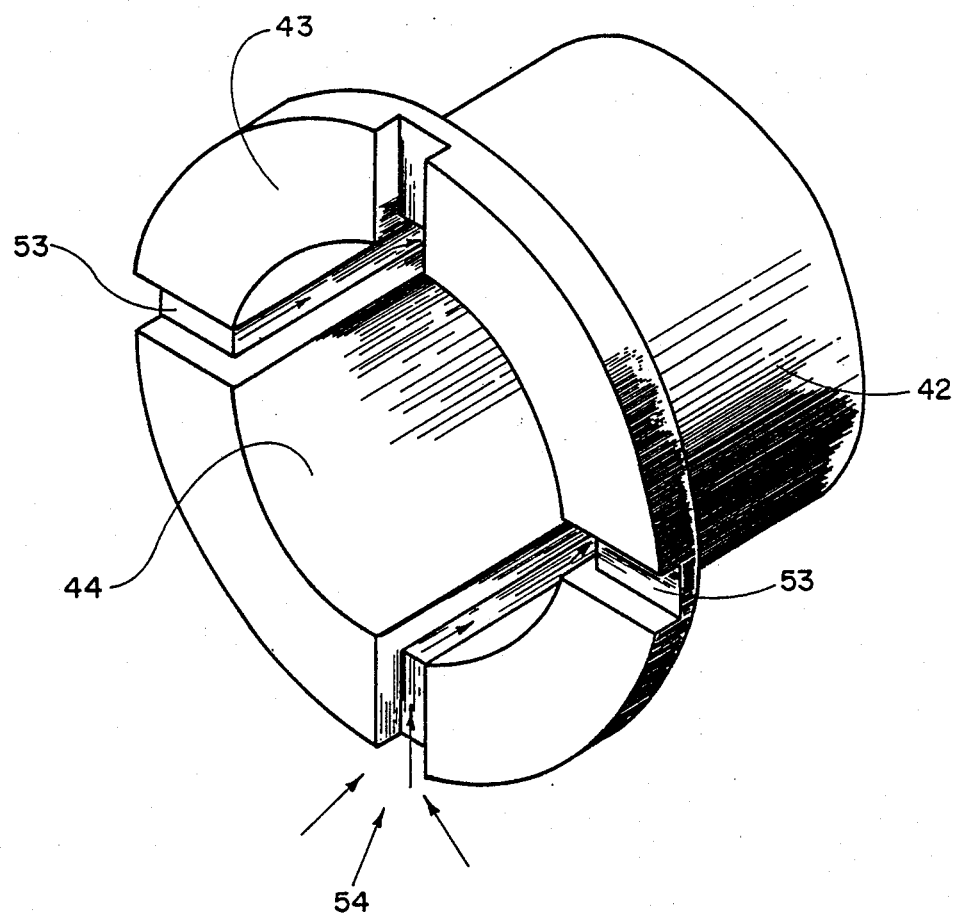
FIG. 9B is an isometric view of the nylon bearing separating the mobile part from the fixed part of the adaptor.
Figure 10:
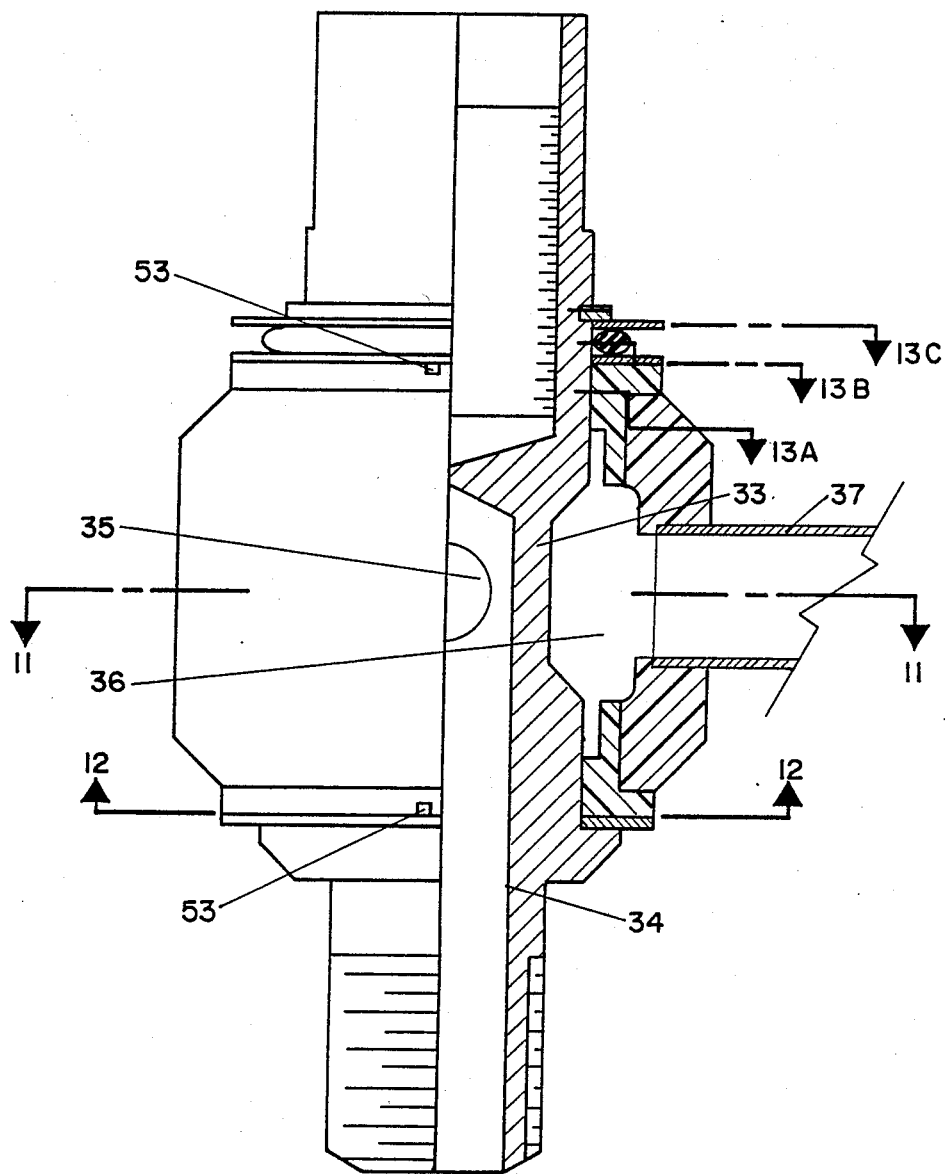
FIG. 10 is a face view of the left hand side and a longitudinal cross section of my adaptor on the right hand side.
Figure 11:
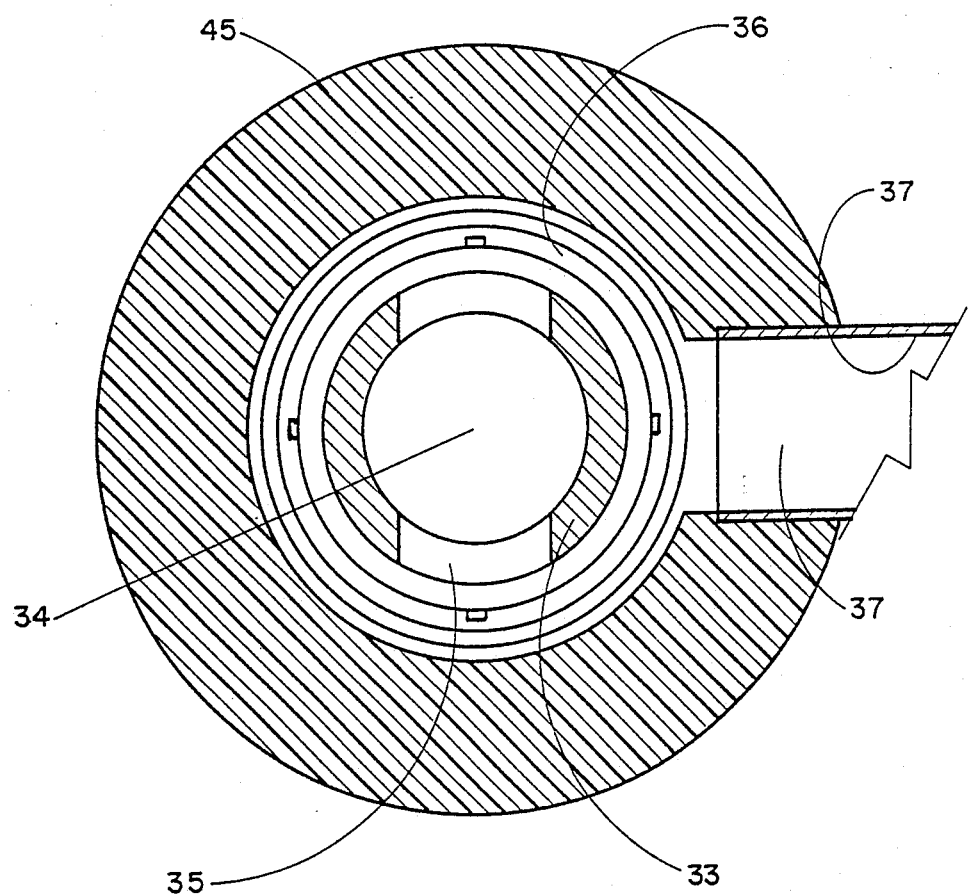
FIG. 11 is a horizontal cross section at the center of the adaptor according to section line 11—11 of FIG. 10 illustrating the horizontal channels of the liquid distribution.
Figure 12:
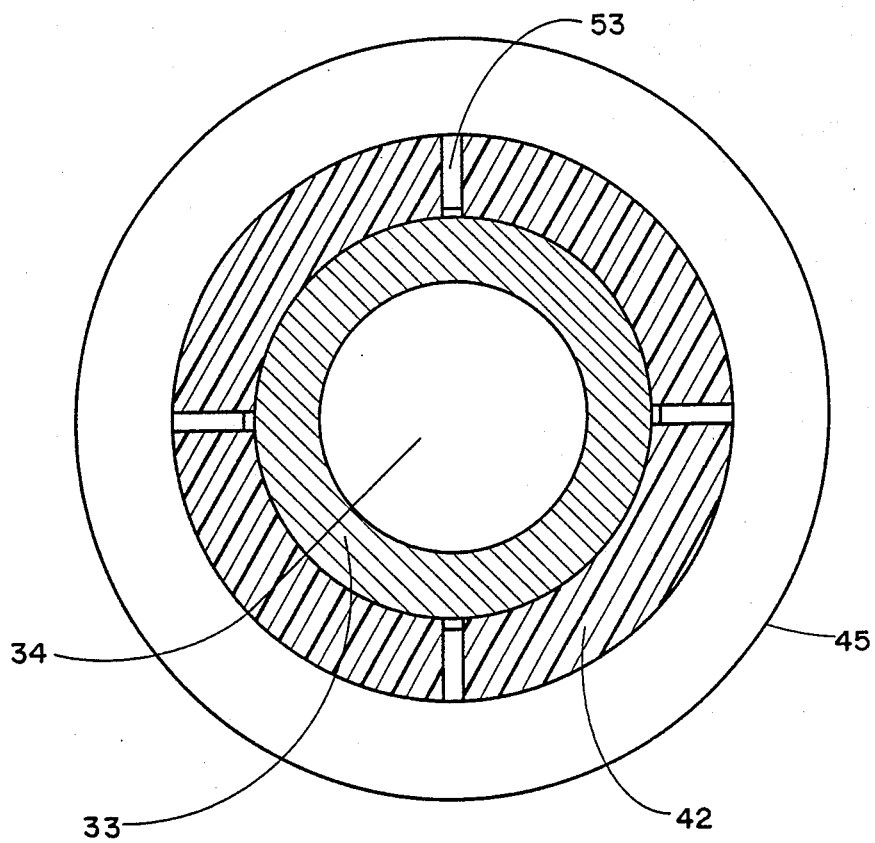
FIG. 12 is an upper view according to section line 12—12 of FIG. 10 illustrating the seat of the rotating movement namely the stainless steel ring and, in bold lines, the dust channel and the nylon bearing.
Figure 13:
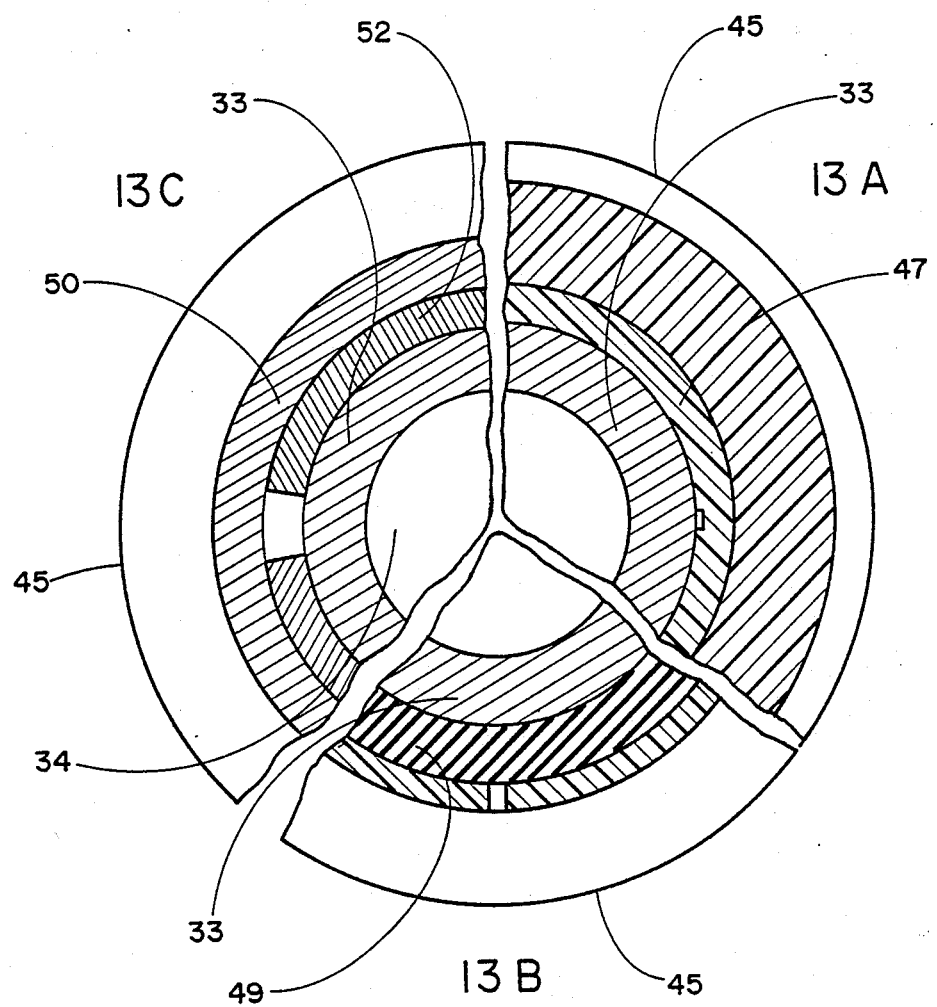
FIG. 13 is a lower view according to lines 13-A to C of FIG. 10 illustrating, in bold characters, the disc spring or lock washer in position in FIG. 13-C, the rubber ring and the exterior part of the horizontal part of the nylon bearing in 13-B also in bold characters, and a section in the interior of the polycarbonate barrel in 13-A.

Referring to FIG. 9B, in the nylon bearing 42 there are ventilation grooves or channels 53 spaced to conduct the wastes or impurities 54 as indicated by the arrows, between the shaft 33 and the bearing 42 towards the cage 36 and the vacuum pipe 37 of FIG. 9. The grooves or channels 53 are continuous between the radial section 43 and the axial section 44, for bearing 41 and similarly for bearing 47.

Any water and mud aspirator may be utilized, the capacity of support of the weight of the carrot being based on the capacity of suction or vacuum of the machine.

The method of feeding water 32 may include a restrained jet as normally utilized in construction, with the jet directed on the exterior and to the base of the drill.

Concerning the materials to utilize, the main shaft 33 is preferably made of steel and threaded in the interior 9 so that it can be fixed to the shaft 4 of the motor. At the other end of the said shaft 33 there is a channel 34 which is directed towards two radial openings 35 which when in rotation pass in front of vacuum pipe 37, this same shaft 33 being threaded on the exterior 13 to form a male end to which may be mounted a dril 5.

The barrel 38 and 45 is made of a plastic of sufficient resistance to hold under pressure the suction pipe 37 and at the same time the two bearings 42 and 47 which are composed of nylon and placed in its axial ends. The shaft 33 slides, in a rotating movement, in the bearings 42 and 47, fitted tighly enough so that the suction is not lost.

I claim:

1. In combination with a motor driven cylindrical drill for carrotting a concrete floor and the like, the drill having spaced hard segments at its working edge, a system comprising:
    (a) means to feed water at the exterior part of the drill, at the concrete floor level, in the direction of the space between the hard segments, for the infiltration of water at the moment of drilling, in the interior direction of the drill and the exterior part of the carrott, thus entraining mud, composed of water and concrete particles, within the top of the drill;
    (b) a mandrel adaptor comprising a central rotating part and an external sliding cage, said adaptor being located between the drill and the motor shaft, said central rotating part fixed to said motor shaft and to the top of said drill; said adaptor being provided with internal channels to enable a vacuum pump or similar suction element connected to the said sliding cage, to aspirate the said mud through said sliding cage, the rotating part and the top part of the drill.

2. An adaptor for a drill carrotting a concrete floor, said adaptor being installed on shaft of the motor and on end of drill and transmitting the effect of suction and vacuum caused by an aspirator, through the interior of a drill, and in a continuous fashion when subjected to a rotation movement, and thus aspirating the debris of concrete and the water utilized for washing and cooling the segments of the drill, and comprising:
    (a) a barrel comprising an interior axial part of a shape following the external contour of the said barrel and capable of retaining a reserve of air and liquid, said barrel having a radial opening connected to a vacuum pipe;
    (b) a central mandrel for installation in the interior axial part of the barrel one extremity of which is adapted on the shaft of the motor and the other extremity being adapted to the interior of the drill and comprising a central axial opening and at least two radial openings whose surfaces are greater, when added, than that of the axial opening, a shoulder, radial and peripheral, for receiving and supporting the said barrel;
    (c) circular bearings with an L-shaped section to rest on the supporting surface of the shoulder of the mandrel and on the base and the interior part of the barrel;
    (d) steel or hard material annular discs used to rest on the metal and to slide on the bearing;
    (e) means to lock in place the hard material discs.

3. An adaptor as described in claim 2 whose means of holding axially in place the steel and rubber rings comprise a spring lock installed in a ravine formed in the exterior part of the mandrel and said spring being secured in place by the compression of a rubber ring placed on a hard material disc.

* * * * *